United States Patent [19]

Holland et al.

[11] Patent Number: 5,072,955

[45] Date of Patent: Dec. 17, 1991

[54] MECHANIC'S HELPER AND STEP PLATFORM

[76] Inventors: John C. Holland, Denbury House, P.O. Box 220, Bailey, Colo. 80421; Joe L. Coppedge, Sr., 3650 S. Federal Blvd., #124, Englewood, Colo. 80110

[21] Appl. No.: 565,131

[22] Filed: Aug. 10, 1990

[51] Int. Cl.[5] .............................................. A01D 67/04

[52] U.S. Cl. .................................... 280/32.5; 182/116; 182/141; 182/91

[58] Field of Search ............................. 280/32.5, 32.6; 182/116, 141, 91

[56] References Cited

U.S. PATENT DOCUMENTS

| | | | |
|---|---|---|---|
| 2,701,168 | 2/1955 | Schemers | 182/116 |
| 4,020,920 | 5/1977 | Abbott | 182/91 X |
| 4,180,143 | 12/1979 | Clugston | 182/91 |
| 4,373,761 | 2/1983 | Hansberry | 182/132 X |
| 4,397,374 | 8/1983 | Rumage et al. | 280/32.5 X |
| 4,405,116 | 9/1983 | Eisenberg | 182/141 X |

*Primary Examiner*—Charles A. Marmor
*Assistant Examiner*—Alan M. Kagen
*Attorney, Agent, or Firm*—Leon Gilden

[57] ABSTRACT

A ruggedly constructed work cart particularly suitable for use by mechanics includes a center work platform which is selectively heightwise adjustable. A series of platforms positionable at different heights allow the cart to function as a ladder, while a removable handle is provided so that the cart can be positioned beneath a vehicle for the purpose of supporting heavy parts. A removable tool tray can be alternatively attached to a vehicle's bumper or tire to provide a mechanic with a "step" to gain better access to a vehicle's engine compartment.

1 Claim, 4 Drawing Sheets

MECHANIC'S HELPER AND STEP PLATFORM

BACKGROUND OF THE INVENTION

1. Field of the Invention

The present invention relates to work supporting carts, and more particularly pertains to a "mechanic's helper" which utilizes an adjustable height work supporting platform and a plurality of adjustably positionable smaller platforms which can function as steps.

2. Description of the Prior Art

The use of wheeled work carts is known in the prior art. More specifically, U.S. Pat. 4,373,761, which issued to Charles Hansberry, Jr. on Feb. 15, 1983, discloses a combined article mover and worker support. The device, as illustrated, comprises a plurality of stepped horizontal platforms or steps, at least one of which is supported vertically by vertical frame members, while an upstanding handle is usable to support and maintain the balance of a worker standing on the uppermost step. The Hansberry cart further includes a tool receptacle positioned on the uppermost step, and locking wheels facilitate a fixed positioning of the cart in a desired location.

The Hansberry cart is a good example of the current state of the art with respect to multi-platform work supporting carts and, while being quite functional for its intended use, it still possesses some inherent disadvantages. For example, the Hansberry cart does not have a provision for adjustably changing the height of the uppermost platform to accommodate the specific needs of a worker. Further, this lack of adjustable heightwise positioning of the uppermost platform prevents the cart from being utilized as a mechanics helper beneath a vehicle, as does the fact that the handle is non-removable. Additionally, the fact that there are only two platforms on the Hansberry cart limits its utility as a ladder.

As can be appreciated, these above-mentioned missing design features somewhat limit the functional usefulness of the Hansberry cart, although the cart is still quite advanced in design with respect to most of the commercially available carts in today's marketplace. Therefore, it can be appreciated that there exists a continuing need for new and improved work supporting carts wherein such carts can be utilized alternatively to accomplish a plurality of different functions and in this regard, the present invention substantially fulfills this need.

SUMMARY OF THE INVENTION

In vie of the foregoing disadvantages inherent in the known types of work supporting carts now present in the prior art, the present invention provides an improved work supporting cart construction wherein the same can be utilized to support and transport parts and tools, while also being functionally usable as a ladder and alternatively as a mechanics tool cart selectively positionable beneath the structure of a vehicle. As such, the general purpose of the present invention, which will be described subsequently in greater detail, is to provide a new and improved work supporting cart which has all the advantages of the prior art work supporting carts and none of the disadvantages.

To attain this, the present invention comprises a "mechanic's helper" type cart which utilizes a plurality of adjustably moveable platforms and tool supporting trays. The device utilizes lockable wheels to facilitate a secure positioning thereof at a desired location, while a central platform is adjustably moveable to an infinite number of variable work heights ranging from 12 to 36 inches from the floor through the use of a motorized or manually adjustable ball screw. Other platforms are provided to facilitate a step-like structure which then allows the cart to function as a ladder while in a locked position next to a vehicle or some similar structure, and with the cart's handle removed, the cart can be positioned in a work position beneath a vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved work supporting cart which has all the advantages of the prior art work supporting carts and none of the disadvantages.

It is another object of the present invention to provide a new and improved work supporting cart which may be easily and efficiently manufactured and marketed.

It is a further object of the present invention to provide a new and improved work supporting cart which is of a durable and reliable construction.

An even further object of the present invention is to provide a new and improved work supporting cart which is susceptible of a low cost of manufacture with regard to both materials and labor, and which accordingly is then susceptible of low prices of sale to the consuming public, thereby making such work supporting carts economically available to the buying public.

Still yet another object of the present invention is to provide a new and improved work supporting cart which provides in the apparatuses and methods of the prior art some of the advantages thereof, while simultaneously overcoming some of the disadvantages normally associated therewith.

Still another object of the present invention is to provide a new and improved work supporting cart which will provide a vehicle mechanic with a means of safely elevating himself to a comfortable work height.

Yet another object of the present invention is to provide a new and improved work supporting cart which is designed to provide a mechanic with work platforms at the side and front of a vehicle simultaneously.

Even still another object of the present invention is to provide a new and improved work supporting cart which is designed to provide a mechanic with a convenient and safe place to lay tools and small parts when not in use.

Yet still another object of the present invention is to provide a new and improved work supporting cart which is designed to provide a mechanic with a means of conveyance to remove heavy parts safely from beneath a vehicle.

Even yet another object of the present invention is to provide a new and improved work supporting cart which is designed to provide a mechanic with a conveyance upon which he can safely remove heavy parts from a vehicle to a work bench.

Still even another object of the present invention is to provide a new and improved work supporting cart which is designed to provide a mechanic with as much versatility as possible in a single, ruggedly built and compact unit with such unit still meeting necessary safety constraints.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
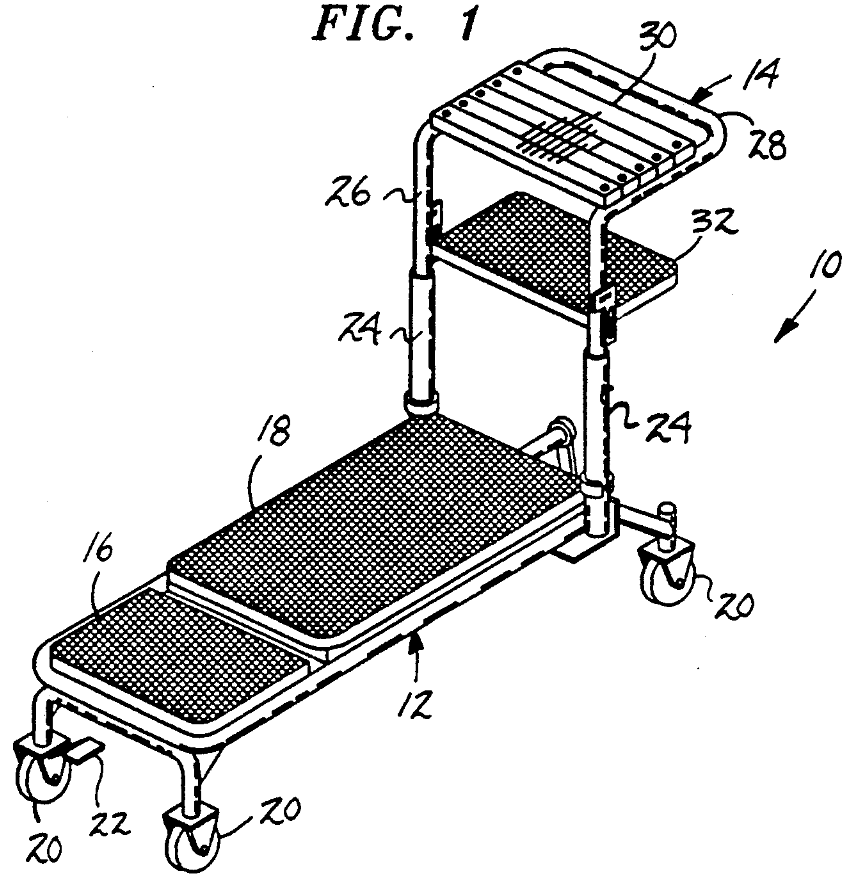
FIG. 1 is a perspective view of the mechanic's helper and step platform comprising the present invention.
Figure 2:
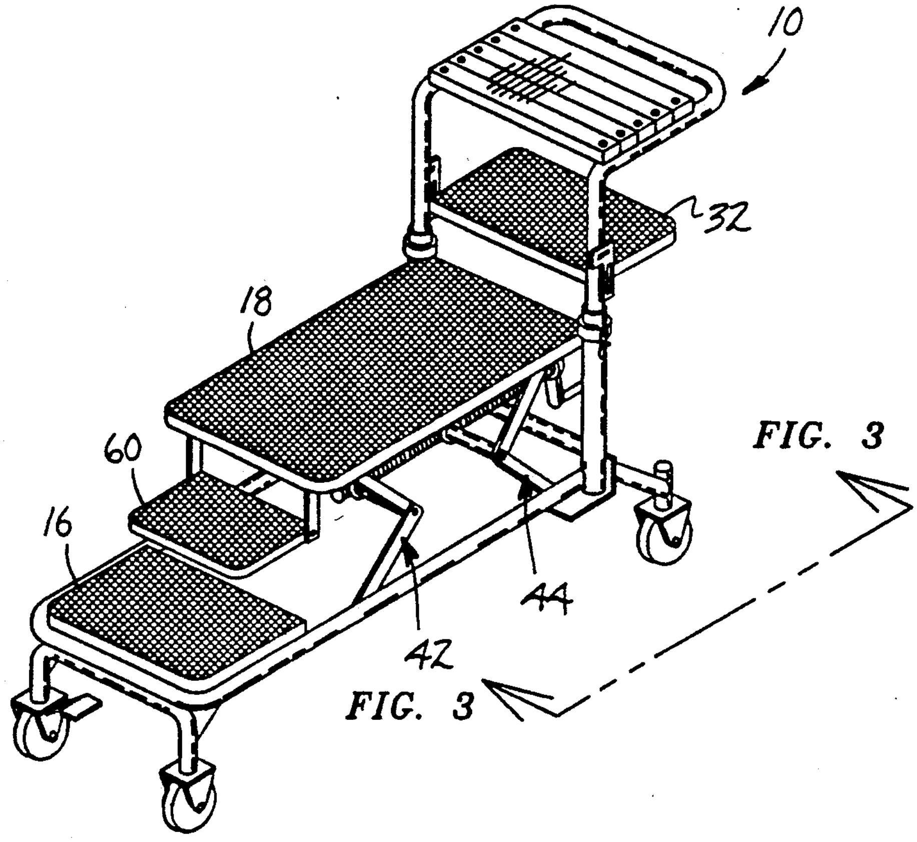
FIG. 2 is a perspective view of the invention showing the adjustable positioning of a center platform associated therewith.

With reference now to the drawings, and in particular to FIG. 1 thereof, a new and improved work supporting cart embodying the principles and concepts of the present invention and generally designated by the reference numeral 10 will be described.

More specifically, it will be noted that the cart 10 essentially comprises a wheeled frame structure 12 to which is attached an upstanding handle structure 14. As shown, the wheeled frame structure 12 includes a fixed step platform 16 attached to a forward section of the structure and a further heightwise adjustable platform 18 whose manner of operation will be subsequently discussed. The platforms 16, 18 are of a conventional construction and have their load supporting surfaces formed from an expanded metal mesh. The wheeled frame structure 12 further includes a plurality of pivotal wheels, each of which is generally designated by the reference numeral 20, and foot operated caster brakes 22 can be attached to one or more of the wheels to effectively lock the cart 10 in a fixed location when so desired.

The aforementioned handle structure 14 includes a pair of upstanding tubular supports, each of which is generally designated by the reference numeral 24, and these supports are fixedly or otherwise removably secured to the wheeled frame structure 12 by any conventional means. Slidably positioned within the tubular supports 24 is an integral handle 26 having an orthogonally directed grip portion 28 to which is fixedly secured a recessed hardwood tool tray 30. Also attached to the push handle 26 is a further work supporting tray or platform 32 which may be selectively removed from the handle and then used as a stepping platform when attached to a vehicle's bumper or tire in a manner which will also be subsequently described.

Referencing FIGS. 2, 3, 4 and 5 in conjunction with FIG. 1, it will be noted that one of the unique and inventive features of the present invention 10 includes the heightwise adjustment feature of the adjustable step platform 18. More particularly, a manually rotatable ball screw 34 is threadably attached to a pair of internally threaded nipples 36, 38. The nipples 36, 38 are oppositely threaded with respect to each other whereby they advance towards each other when a handle 40 attached to the screw 34 is rotated in a counterclockwise manner. By the same token, the nipples 36, 38 move away from each other when the handle 40 is rotated in a clockwise direction. Further, as clearly illustrated in FIGS. 3 and 4, the nipples 36, 38 are respectively centrally attached to scissors-like linkage systems 42, 44.

Figure 3:
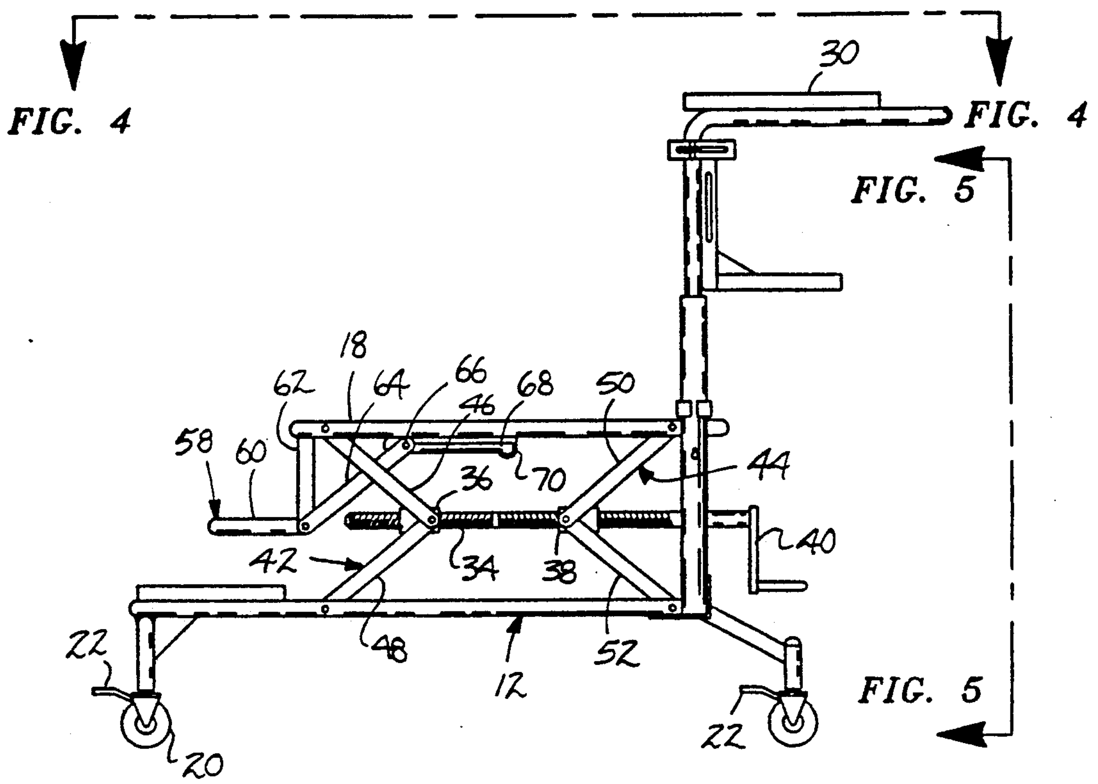
FIG. 3 is a side elevation view of the invention as viewed along the line 3—3 illustrated in FIG. 2.
Figure 4:
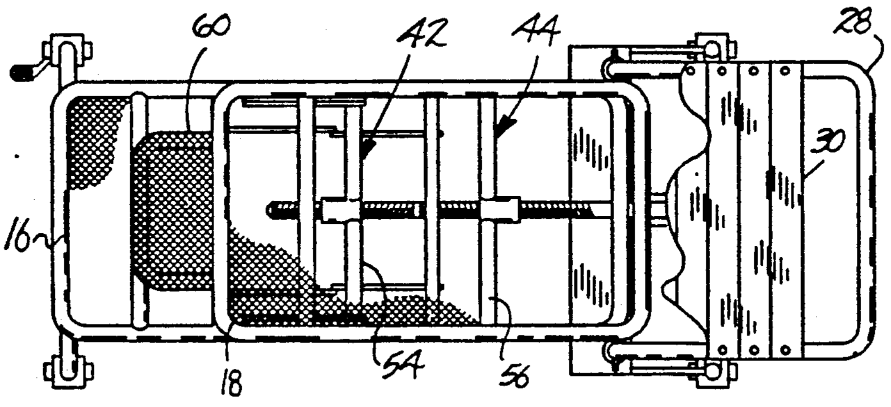
FIG. 4 is a top plan view of the invention as viewed along the line 4—4 shown in FIG. 3.

The linkage system 42 includes pairs of oppositely disposed link members 46, 48, only one pair of which is shown in FIG. 3, while the linkage system 44 includes pairs of oppositely disposed link members 50, 52 with only one set of such members being shown in FIG. 3. The link members 46, 48 have first ends thereof pivotally attached to a transversely positioned rod member 54 and the nipple 36 is fixedly secured to a center portion of the rod member. The remaining free ends of the link members 46, 48 are respectively pivotally attached to a side frame member associated with the heightwise adjustable platform 18 and a side frame member associated with the wheeled frame structure 12.

Similarly, the link members 50, 52 are pivotally attached to respective ends of a transversely extending rod member 56, and the rod member 56 has the nipple 38 fixedly secured to a center portion thereof. The remaining free ends of the link members 50, 52 are then pivotally attached to the frame structure of the adjustable platform 18 and the frame structure 12. Accordingly, the link assemblies 42, 44 are respectively defined by the link members 46, 48, 54 and 50, 52, 56, whereby the scissors-like movable linkage assembly for raising and lowering the platform 18 is defined.

As also shown in FIGS. 2, 3, 4 and 5, a folding step assembly 58 is pivotally fixedly secured to the frame structure of the adjustable step platform 18. The folding step assembly 58 includes a step platform 60 pivotally attached to the adjustable platform 18 by a pair of link members 62, only one of which is shown in FIG. 3, and is further secured to the platform 18 by a pair of adjustably movable link members 64, only one of which is shown in FIG. 3. The pairs of link members 62, 64 are pivotally connected to the step platform 60 at common attachment points. The remaining free ends of the link members 62 are attached to the external frame structure of the adjustable platform 18, while the remaining free ends of the link members 64 are connected by slidably movable pins 66 which are fixedly slidably secured within horizontal slots 68 formed in a connection member 70. The connection members 70 are disposed on opposite sides of the adjustable platform 18 and include locking indentations at respective ends of the slots 68 wherein the pins 66 can reside in a substantially fixed position in the opposed slot ends. As is now apparent, this structure permits the step platform 60 to be moved into the position shown in FIG. 3 when the pins 66 are disposed at one end of the slots 68. With the pins 66 moved to the opposite ends of the slots 68, the step platform 60 will be folded beneath the adjustable platform 18 and be disposed in an orthogonal relationship to the floor on which the cart 10 is positioned.

Figure 5:
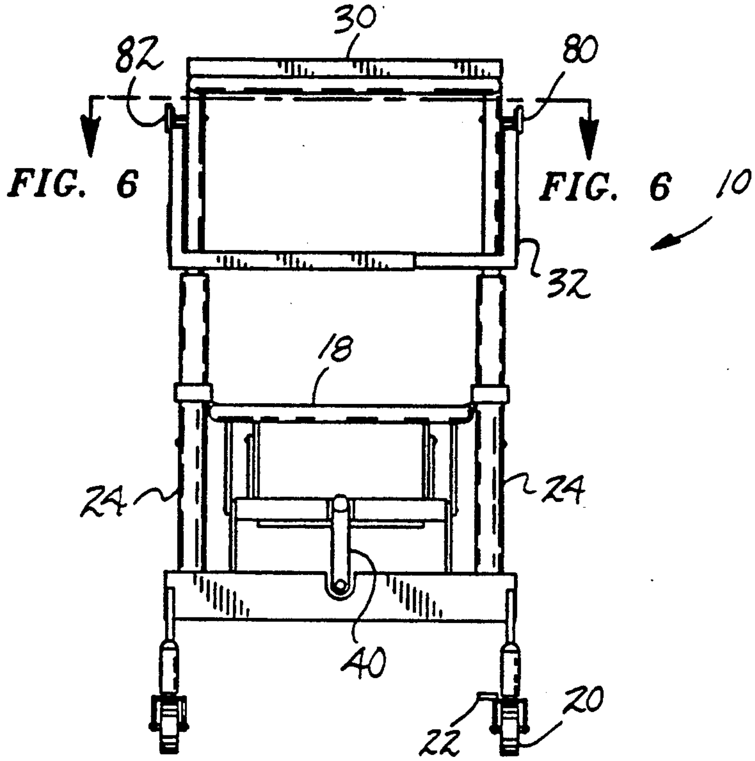
FIG. 5 is an end elevation view of the invention as viewed along the line 5—5 shown in FIG. 3.
Figure 6:
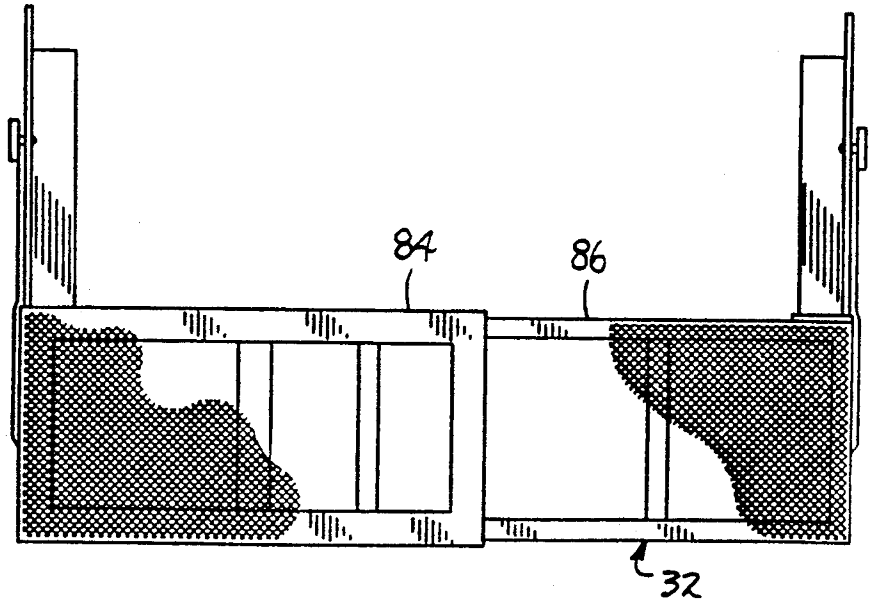
FIG. 6 is a partial top plan view of the tool supporting tray forming a part of the present invention and as viewed along the line 6—6 shown in FIG. 5.
Figure 7:
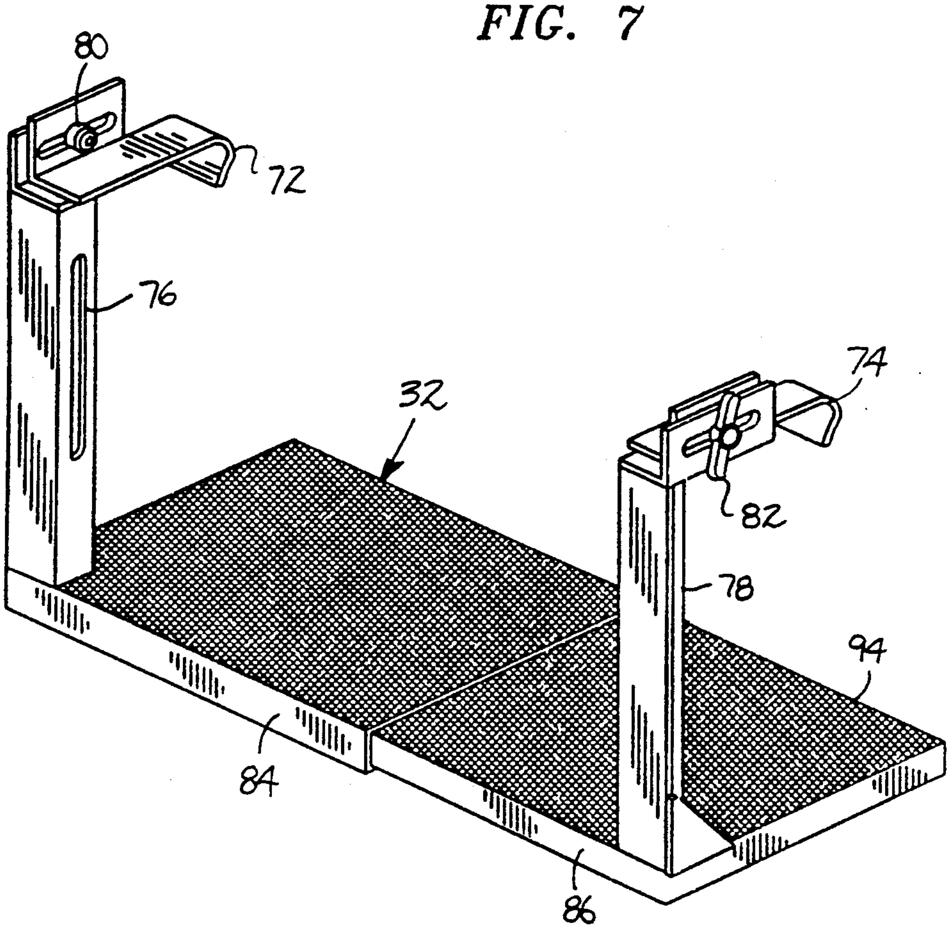
FIG. 7 is a perspective view of the mechanic's step platform forming a part of the present invention and which is removable from the invention for attachment to a vehicle's bumper.

FIGS. 5, 6 and 7 more particularly illustrate the construction of the tool tray 32 which is selectively utilizable as a vehicle bumper or tire step. As shown, the tray 32 may be selectively disengaged from the push handle 26 with its attachment thereto being by any conventional means. In this regard, a preferred manner of attachment is through the use of a pair of hook members 72, 74 which are slidably, adjustably attached to respective upstanding support arms 76, 78. Such an adjustable attachment of the hooks 72, 74 to the arms 76, 78 can be accomplished through the use of conventional thumb screws 80, 82. When disengaged from the push handle 26, the thumbscrews 80, 82 serve as locking and positioning means for the respective hook members 72, 74. A novel feature of the hook members 72, 74 is that they are ideally shaped and positionable to fit over a top edge of a conventional vehicle's bumper with the tray 32 then extending beneath the bumper and serving as a step for a mechanic to stand on while working on a vehicle's engine. Depending upon the shape of the vehicle's bumper, the tool tray 32 is constructed of two telescoping sections 84, 86 wherein a widthwise adjustment can be achieved to accommodate the particular shape and dimensions of the bumper at issue.

Figure 8:
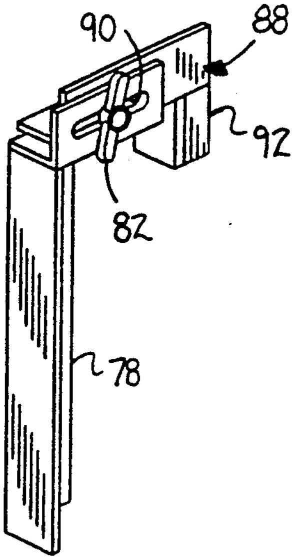
FIG. 8 is a perspective view of an alternative mount used in conjunction with the mechanic's step platform wherein such platform can be removed from the cart and attached to a vehicle's tire.

A further novel feature of the present invention is illustrated in FIG. 8 wherein one of the support arms 78 is illustrated with it being understood that the same structural change is also available with respect to the arm 76. In this connection, upon removal of the thumbscrew 82, the hook member 74 can be removed and an L-shaped member 88 can be substituted therefor. By the positioning of the thumbscrew 82 within a longitudinal slot 90, with such longitudinal slot being aligned with a further unillustrated longitudinal slot in the member 88, a spaced relationship is achievable between the upstanding support arm 78 and a downward extending support portion 92 forming a part of the L-shaped member 88. This spaced relationship between the members 78, 92 is adjustably variable to the extent that both support arms 76, 78 can be positioned over a top circumferential portion of a vehicle's tire. The inner edge 94, as best illustrated in FIG. 7, of the step 32 is positionable against the rim member of the tire and accordingly, a fixed securement of the step assembly 32 to the tire is achieved whereby a worker can stand on the step to gain better access to the vehicle's engine.

As to the manner of usage and operation of the present invention, the same should be apparent from the above description. However, a brief summary thereof will be provided. More specifically, it can be seen that the cart 10 can in a first instance be used as an adjustable step ladder. In this respect, the adjustable platform 18 can be raised to a desired height above the fixed platform 16, with this height varying as much as twenty four inches therebetween. The adjustable step 60 may then be pivoted downward and locked in position in parallel relationship to the platforms 16, 18 so as to provide a three step ladder.

From a further functional standpoint, when a vehicle is partially or completely raised on a car lift, the handle assembly 14 may be lifted away from the cart 10 so that the same can be positioned beneath the vehicle. If necessary, the adjustable platform 18 can be raised to as high as 36 inches above the surface of the floor whereby a transmission or some similar heavy part of a vehicle can be easily positioned on and supported by the cart 10. The cart is designed to hold weights of up to at least five hundred pounds.

When not being utilized in a step ladder or parts transporting role, the cart 10 might be positioned either in front of or beside a vehicle's engine compartment with a fixed positioning thereof being achieved through the use of a caster brake 22. The step platform 32 could then be removed from the cart 10 and alternatively attached to the vehicle's bumper or one of the forwardly positioned tires so as to give a mechanic stepup platforms concurrently positioned in front of and along side of the vehicle. While working on the engine compartment, the tool tray 30 may be utilized to keep tools and parts in ready access to the mechanic.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved work supporting cart comprising:

a frame member;

a plurality of sheet members secured to said frame member and being operable to effect a selective movement and positioning of said frame means relative to a ground surface;

first work supporting platform fixedly secured to said frame member;

and second work supporting platform means fixedly adjustably secured to said frame and being movable relative thereto and to said first work supporting platform for effecting a selective positioning at said second work supporting platform relative to said first work supporting platform, and further including a handle means removably attached to said frame member, said handle means being removable to permit a positioning of said work supporting cart beneath a chosen structure, and including a tool tray attached to a topmost portion of said handle means and projecting beyond said frame member, and including a third work supporting platform pivotally fixedly attached to said second work supporting platform means adjacent said first work supporting platform, said third work supporting platform comprising a folding step assembly movable into a position to function as a step when said second work supporting platform means is in a second position spaced above said first work supporting platform from a first lowered position adjacent said first work supporting platform to facilitate a desired positioning of said first, second and third work supporting platform means in a step-like manner to facilitate their concurrent use as a ladder, and said tool tray attached to said handle means forming a part of said work supporting cart, said tool tray being selectively removable from said cart to facilitate a selective attachment of said tool tray platform means to a vehicle, and said tool tray spaced above said first work supporting platform and including a plurality of hook members selectively securable to the tool tray spaced above a top surface of said tool tray for securement to a vehicle's bumper to facilitate its use as a step.

* * * * *